Figure 4:
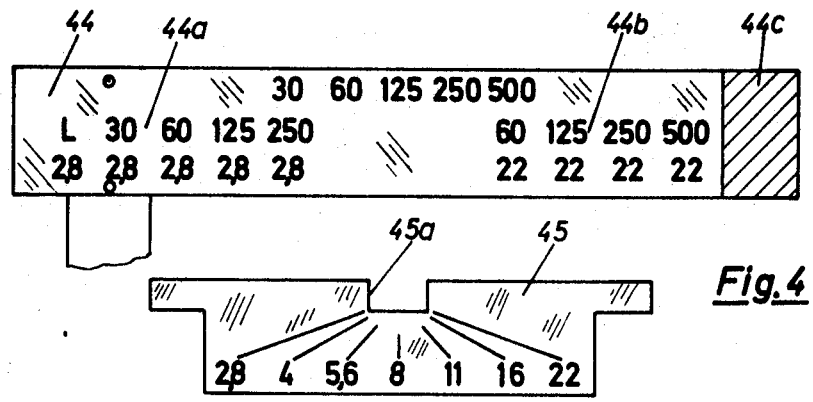

United States Patent [11] 3,611,893

[72] Inventor  Franz W. R. Starp
             Calmbach/Black Forest, Germany
[21] Appl. No. 804,209
[22] Filed    Mar. 4, 1969
[45] Patented Oct. 12, 1971
[73] Assignee Prontor-Werk, Alfred Gauthier G.m.b.H.
             Black Forest, Germany
[32] Priority Mar. 5, 1968
[33]          Austria
[31]          A 2139/68

[54] PHOTOGRAPHIC CAMERA WITH A SCANNING MECHANISM AND AN ELECTRONIC TIMING DEVICE
     10 Claims, 6 Drawing Figs.
[52] U.S. Cl. .................................................. 95/10 C,
                                            95/53 E, 95/64 R
[51] Int. Cl. ...................................................... G03b 7/12,
                                                    G03b 9/62
[50] Field of Search .......................................... 95/10, 53,
                                                          64

[56]            References Cited
           UNITED STATES PATENTS
2,179,717  11/1939  Fedotoff ....................... 95/53 X
2,978,970  4/1961   Fahlenberg .................... 95/10 X
3,063,354  11/1962  Matulik et al. ................. 95/10
3,257,919  6/1966   Sato et al. ..................... 95/10
3,455,219  7/1969   Burgarella ...................... 95/10
3,460,451  8/1969   Starp et al. .................... 95/10
3,464,332  9/1969   Davison et al. ................. 95/10
3,468,235  9/1969   Rittman ......................... 95/53

Primary Examiner—Joseph F. Peters
Attorney—March, Le Fever & Wyatt

ABSTRACT: A photographic camera is provided with a scanning mechanism and an electronic timing device which cooperate with an exposure meter to permit automatic setting of exposure times and diaphragm aperture values.

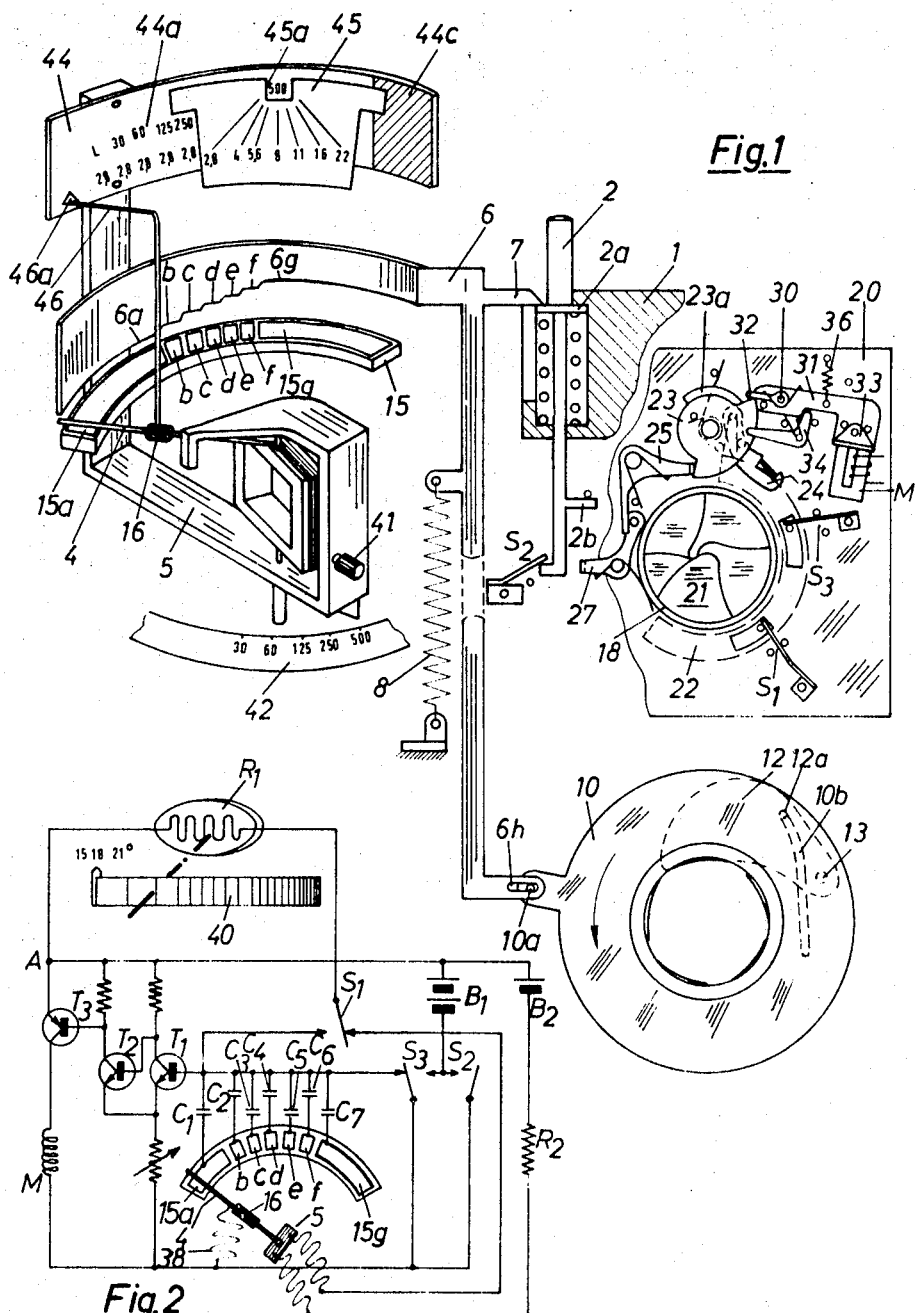

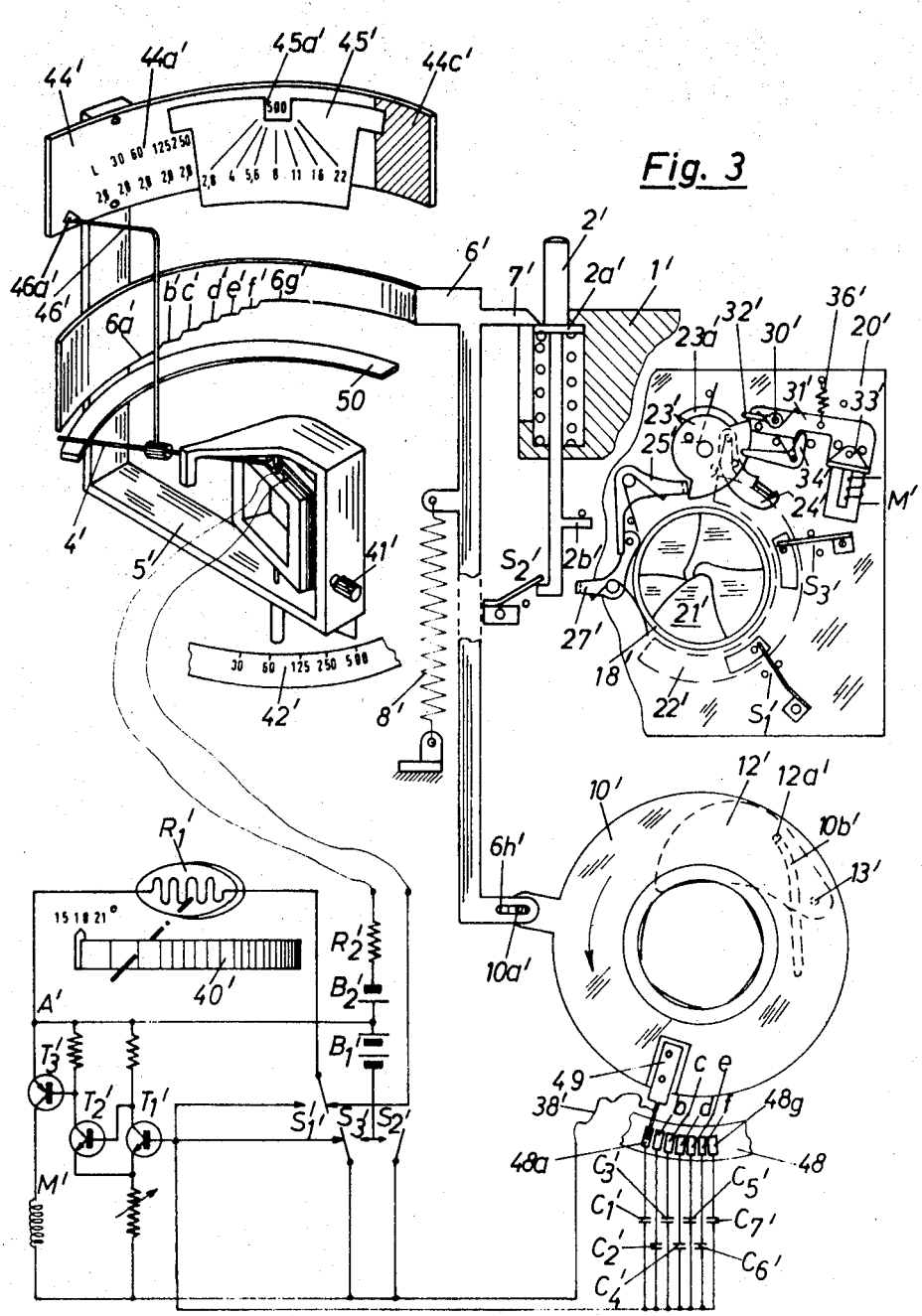

PHOTOGRAPHIC CAMERA WITH A SCANNING MECHANISM AND AN ELECTRONIC TIMING DEVICE

The invention concerns a photographic camera with an exposure meter and a diaphragm scanning mechanism as well as an electronic timing device which includes resistance-capacitance or RC sections, the light conditions being considered by means of a photoresistance when setting the diaphragm and the time.

Cameras with electronic exposure control as well as exposure control depending on light conditions are usually designed in such a way that the diaphragm setting is preselected, while the exposure time is automatically set under consideration of the preselected diaphragm setting and of the prevailing light conditions. Although the exposure results obtainable with such cameras are quite good, the range of usage of these cameras is limited. The reason is that with preselection of the diaphragm setting the limits of the setting possibilities of the camera are reached more rapidly than if the exposure time were first preselected and the corresponding diaphragm valve were set thereafter. Further the majority of cameras suitable for taking pictures by hand have fewer steps in the diaphragm range. However, for most pictures the precise exposure time is of definitive importance, whereas the diaphragm setting plays a rather subordinate role. The adjustment of exposure time to the object to be photographed can only be achieved via the diaphragm setting in the cameras in question.

It is an object of this invention to improve a camera of the type described above through the exploitation of the advantages of a timing device depending on light and working on electronic principles to such an extent that on the one hand properly exposed photographs can be achieved without any special photographic knowledge, and on the other hand a possibility is given of adjusting the camera according to the motive in regard to exposure time as well as in regard to diaphragm setting.

It has now been found that the foregoing and related objects can be readily attained in a photographic camera wherein the circuit of the electronic timing device has several compensating condensers of different capacity. The number of these condensers corresponds to the steps of the scanning elements of the scanning mechanism. The compensating condensers are each electrically connected with one contact surface. One of these condensers can be placed into the circuit of the timing device by means of a movable contact for the formation of an RC member. Each movable contact depends on the exposure meter needle and furthermore, the exposure meter can be set by means of a manual arrangement for time preselection. In this manner it is possible to create an electronic camera which permits automatic setting of the exposure time and the diaphragm, although it has the possibility of preselecting the time. For this reason an amateur photographer readily can take pictures with the correct exposure since he does not have to concern himself with the factors of exposure time and diaphragm setting. The camera also responds to the requirements of the experienced photographer who wishes to relate exposure time or diaphragm setting to the object to be photographed, since by means of the adjustable exposure meter he has the key for the division of exposure value into exposure time and diaphragm setting. The preselected exposure time is set by the application of compensating condensers if it results in an exposure corresponding to the light conditions for one of the diaphragm settings of the camera. If, however, either by application of the largest or the smallest diaphragm setting no exposure that is in correct relation to the light conditions is achieved, then with the retention of the extreme diaphragm setting the preselected exposure time is changed and either prolonged or shortened according to prevailing light conditions. These variations of exposure time take place without further steps and they can be extended into the long duration range.

A highly advantageous arrangement of the contact surfaces for the shutter or diaphragm mechanism from the point of view of space, and sometimes also of the compensation condensers is achieved when the contact surfaces are assigned to a contact part fitted to the movable part of the exposure meter. This permits a design which saves on parts in such a way that the movable contact part is formed by the exposure meter indicator.

Another favorable arrangement is achieved when the contact surfaces are assigned to a movable contact part depending on the movement of the scanning element. If in this arrangement the contact part is fitted to the diaphragm setting ring which can be moved by the scanning element, the compensation condensers can also be placed in the diaphragm mechanism.

To make it possible to read in a simple manner the exposure factors, whether they are set or whether they differ from the preselection, prior to an exposure, a graduated strip is provided. This strip can be moved with the frame of the exposure meter. The graduated strip carries graduations for exposure time and diaphragm setting and is assigned to a fixed scale plate which carries a diaphragm scale. These scales work together with a pointer of the exposure meter which swings out depending on the particular exposure.

Figure 5:
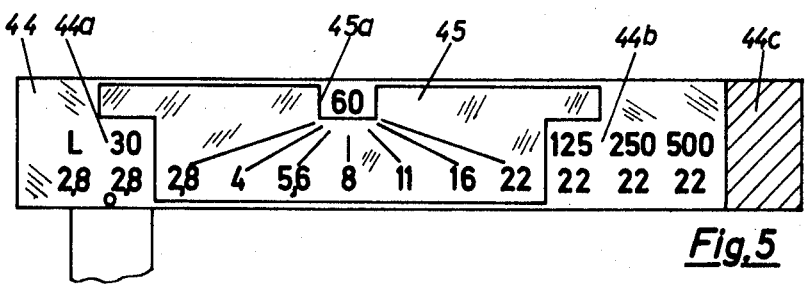
Figure 6:
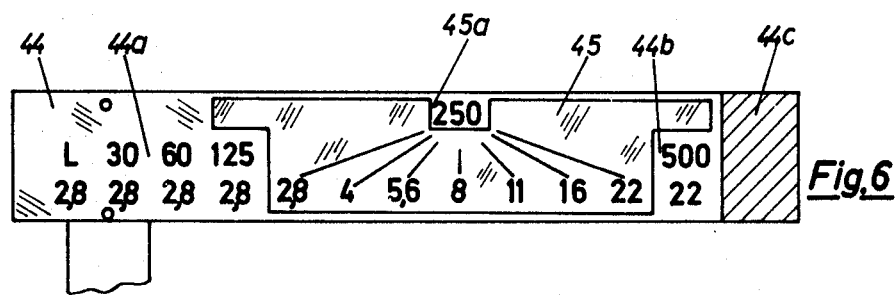

Other objects and advantages will be readily apparent from the following detailed specification and claims and the drawings attached hereto illustrating two embodiments of the invention wherein:

FIG. 1 is a partial perspective and schematic view of the scanning mechanism of the camera for the diaphragm setting controlled by an exposure meter, and also an electronically controlled shutter actuating mechanism. The contact surfaces of the compensation condensers are assigned to the exposure meter pointer, FIG. 2 is a schematic view of the electronic timing device wherein the exposure meter pointer and the compensation condensers are indicated, FIG. 3 is a partial perspective and schematic view of another embodiment of the invention with the assignment of the contact surfaces of the compensation condensers, similar to FIG. 1, to a contact part on the diaphragm setting ring, FIG. 4 is an expanded view of the scales that work with a pointer of the exposure meter, FIGS. 5 and 6 are expanded views of the scales, one covering the other at certain preselected exposure times.

Referring now in detail to the attached drawings, a camera housing 1, as illustrated in FIG. 1 and not shown in detail for clarity, supports a spring-loaded plunger 2 which is fitted in such a way that it can be pushed and serves to release the shutter mechanism described below. A scanning mechanism, also illustrated schematically in FIG. 1 for clarity, works with the release plunger 2 and scans the pointer 4 of the coil meter movement 5 and thereby sets the diaphragm mechanically for a certain aperture prior to releasing the camera. A scanning slide 6 is designed to perform this task and is connected by means of a lug 7 under the bias of a spring 8 to a collar 2a of the plunger 2. The scanning slide 6 is made with graduations 6a through 6g, one of which places itself upon the exposure meter pointer 4 during the scanning process. The scanning motion is transferred by means of a pin-slot connection 6h, 10a onto a diaphragm setting ring 10 which has several control slots 10b of which the drawing shows only one for clarity. A pin 12a of a diaphragm segment 12 enters in every control slot 10b and this segment is fitted to a fixed pin 13.

As FIG. 1 further illustrates, there is in the range of the meter pointer 4 a ladder 15 which has contact surfaces 15a through 15g. These contact surfaces, the importance of which will be explained below, correspond to the graduations 6a through 6g of the scanning slide 6. THe contact surfaces 15a and 15g are assigned to the extreme values of the diaphragm setting, for instance "2.8" and "22" and the corresponding steps 6a and 6g of the scanning slide 6 are extended to the end of the turning capacity of the exposure meter pointer 4. The exposure meter pointer 4 which works together with the contact surfaces 15a to 15g serves as a contact part and is located in an insulating bushing 16. The scanning slide 6 which connects the pointer 4 with one of the contact surfaces 15a through 15g is made of insulating material, for instance of plastic. However, it is also possible for the steps 6a to 6g of the scanning slide 6 to be covered with a material that does not conduct electricity. This insulating measure may be omitted when the scanning slide 6 is electrically grounded.

The camera is also equipped with a mechanical shutter mechanism which is provided with an electronic timing device, the control of which is dependent on light conditions. For the purpose of clarity of illustration, this shutter mechanism is shown offset from the diaphragm setting ring 10 and is in fact the same diaphragm. It is well known that in actual practice the objective passageway of the diaphragm setting ring 10 is arranged on the same axis as the exposure opening 18 of the diaphragm baseplate 20. The offset shutter mechanism shown in the FIG. 1 has sectors 21 which can be moved back and forth in the well-known manner by means of a crank drive which actuates a sector-ring 22. The crank drive consists of a spring-actuated drive disc 23 as well as of a drive pawl 24 which meets in a form fitting manner with a sector-ring 22, and it can be held by means of a stationary blocking lever 25 in the cocked position as shown in FIG. 1. The blocking lever 25 works with a release lever 27 which can be moved by means of a cam 2b fitted to the release plunger 2. The arrangement is such that upon pressing down the release plunger 2, the release lever 27 is turned counterclockwise whereupon the blocking lever 25 frees the drive disc 23. Thereupon the disc 23 unwinds in a clockwise direction and thus moves the diaphragm sectors into the open and the shut position.

Furthermore, the shutter baseplate 20 carries an electromagnetic blocking mechanism, which is controlled by an electronic timing device that will be described hereunder. This mechanism is capable of blocking the shutter sectors in the open position for a certain time. This blocking mechanism has an armature lever 31 mounted on a fixed pin 30. This armature lever carries on one end a spring fitted strip 32, and the other end an armature 33 working with an electromagnet M. For support, there is an angled catch lever 34 applied to the armature lever 31, one arm of the catch lever 34 being in the moving range of a stop lug 23a mounted on the drive disc 23. In the cocking position of the shutter described in FIG. 1 the armature 33 is held by the electromagnet M counter to the effect of a return spring 36.

The above-mentioned timing arrangement is schematically shown in FIG. 2 and is formed as a transistor sweep circuit. The circuit includes the three transistors $T_1$, $T_2$ and $T_3$ with the electromagnet M in the collector circuit of the transistor $T_3$. To achieve an exposure time control that depends on light conditions, a photoresistance $R_1$ is provided which on one side is connected to the time control at point A, and on the other side is connected to a switch $S_1$. The switch $S_1$ is provided in order to first connect the photoresistance $R_1$ to the meter circuit of the exposure meter 5 and to make it part of the circuit of the electronic timing device after the completion of the scanning by the exposure meter pointer 4. The device contains several compensating condensers $C_1$ to $C_7$ of differing capacity which correspond to the number of graduations 6a through 6g of the scanning slide 6. These condensers are connected on one side with the base of transistor $T_1$ and on the other side each condenser is connected with one of the aforementioned contact surfaces 15a through 15g which serve as stops for the exposure meter pointer 4 which functions as a contact part. This pointer 4 is connected to the circuit of the electronic timing device by means of a flexible conductor 38.

A switch $S_2$ closes on actuation of the release trigger 2, and thus connects the electronic timing device with a battery $B_1$. Another battery $B_2$ serves to provide power for the meter movement 5. Finally there is a switch $S_3$ which short circuits the compensating condenser engaged at the time when the shutter is in the resting position. However, in the contact position, not shown, this switch $S_3$ makes it possible to charge up the special condenser and simultaneously furnishes a parallel connection relative to the main switch $S_2$. The previously mentioned compensating condensers $C_1$ through $C_7$ are so sized from the point of view of capacity that within a certain brightness range a definite exposure time always results in connection with the corresponding resistance value of the photoresistance. FIG. 2 also shows the location of a neutral wedge 40 in front of the photoresistance $R_1$ in order to allow for differing film sensitivities.

The camera arrangement described above with automatic as well as light dependent control of diaphragm and exposure time settings presents the possibility of presupposing the distribution key for the division of an exposure value into time and diaphragm setting; in such case it is advantageous to preselect the exposure time for which the diaphragm setting is rated in accordance with the light condition. To achieve this end, the coiled meter movement 5 is so fitted into the camera that it can be turned as it is connected to a means of manual movement which, in FIG. 1 is indicated by the knob 41. It is thus possible to set the meter movement 5 relative to a fixed exposure time scale 42. With the meter movement 5 there is a movable scale strip 44 which is marked with the exposure time and diaphragm aperture scales according to illustration in FIG. 4. A stationary scale plate 45 is assigned to the scale strip 44. On this scale plate 45 the diaphragm aperture values which can be set on the camera are marked. The scale plate 45 is also equipped with a window 45a through which the preselected exposure time, which is marked on the movable scale strip 44 can be read.

The functioning of the advantageous camera design described above, and illustrated in FIGS. 1 and 2, is as follows:

By means of the knob 41 the camera can be, for example, set for an exposure time of one five-hundredth second which can be read on the scale 42 as well as through the window 45a of the stationary scale plate 45. When the shutter is at rest the photoresistance $R_1$ is in the measuring circuit with the battery $B_2$ and the compensating resistance $R_2$. As long as there is no illumination, or only very weak illumination on the photoresistance $R_1$, as is the case for instance, when the camera's carrying case is closed, there is practically no current flowing in the measuring circuit. Thus the exposure meter pointer 4 takes the normal position shown in FIGS. 1 and 2. When the camera is pointed toward the object to be photographed which is lit by a certain light intensity $H_1$, the exposure meter pointer 4 swings out as a consequence of the diminishing resistance value of the photoresistance $R_1$ and comes to rest, for example, upon the contact surface 15d, to which the step 6d of the scanning slide 6 is assigned. The pointer tip 46a of an arm 46 that is movable with the exposure meter pointer 4 will then indicate the diaphragm aperture value "8" on the stationary scale plate 45. The preselected exposure time value "500," visible in the window 45a, is assigned to the aperture value "8." Now, if the camera trigger 2 is pressed down, then the scanning slide 6 follows, under the effect of the spring 8, until the step 6d lies on the exposure meter pointer 4 and presses it onto the contact surface 15d. Accordingly the diaphragm aperture is set to the indicated value "8," and simultaneously the condenser $C_4$ is provided in the control circuit.

At the beginning of the release movement, the principle switch $S_2$ is closed resulting in the admission of current to the electromagnet M through the control of transistors $T_2$ and $T_3$. Thus the armature lever 31 is stabilized in the position shown in FIG. 1 by magnetic force. As the release movement of the plunger 2 progresses, the drive disc 23 is freed and thereupon the drive disc 23 rotates and carries the shutter sectors into the open position. On reaching this open position the lobe 23a of the drive disc 23 meets the catch lever 34 which is supported by the armature lever 31, whereby the continued movement of the drive disc 23 is initially blocked. During the opening movement of the sector ring 22, the two switches $S_1$ and $S_3$ shift over from the contact position shown in FIG. 1 and 2 resulting on the one hand in the photoresistance $R_1$ being brought into the circuit of the electronic timing circuit, and on the other hand in starting a charge of the engaged condenser $C_4$. The RC member is formed during light intensity $H_1$, by the photoresistance $R_1$ and the condenser $C_4$. When the preselected time has elapsed, in this case one five-hundredth second, the condenser $C_4$ will have reached the base potential of the transistor $T_1$ so that the two transistors $T_2$ and $T_3$ are then blocked. Consequently, the electromagnet M becomes deenergized and the armature lever 31 under the influence of the return spring 36 turns in counterclockwise direction, whereby the catch lever 34 loses its support and permits the drive disc 23 to continue its movement, whereupon the shutter sectors change again into the closed position.

When there is a lesser light intensity $H_2$ then the exposure meter pointer 4 swings out less and comes to rest, for instance on the contact surface 15b while the coil meter movement 5 maintains its basic position and thus also the exposure time of one five-hundredth sec. This results in a connection with the step 6b and a diaphragm aperture value of 4 during the scanning action. THe exposure meter pointer 4 in conjunction with the contact surface 15b brings the condenser $C_2$ is in comparison, smaller than that of the condenser $C_4$, specifically so much smaller that during the lower light intensity and the correspondingly larger Ohmic value of the photoresistance $R_1$, the preselected exposure time of one five-hundredth second is formed. The same result is obtained when the exposure meter pointer 4 places one of the condensers $C_3$, $C_5$ or $C_6$ in the circuit while retaining the preselected time of one five-hundredth second. In all these cases the tip 46a of the arm 46, which is connected with the exposure meter pointer 4, points to one of the diaphragm aperture values "4" to "16" of the stationary scale plate 45. When the tip 46a is opposite the aperture value "2.8" of the scale plate 45, then the exposure meter pointer 4 is over that end of contact surface 15a which adjoins contact surface 15b. In this case the condenser $C_1$ is engaged, which, in connection with the photoresistance $R_1$ also brings forth the preselected exposure time of one five-hundredth seconds. Upon further decreasing light intensity the largest aperture is set corresponding to step 6a of the scanning slide 6. However, an exchange of the condensers no longer takes place, but instead the condenser $C_1$ remains switched on and a longer exposure time is formed corresponding to the larger Ohmic value of the photoresistance $R_1$ regardless of the preselection of one five-hundredth second. The exposure times which diverge from the preselected value can be read by means of the tip 46a off the exposure time scale 44a, 44b imprinted on the movable scale strip 44.

The time control switching acts in analog fashion when the exposure meter pointer 4 comes to rest in the range of contact surface 15g. This means that the preselected exposure time is still set when the tip 46a is opposite the value "22" of the scale plate. If the exposure meter pointer swings out even further then, provided this is possible with the shutter mechanism, even shorter exposure times are set while the smallest diaphragm aperture value is kept. But if the shortest possible exposure time is already set and if the exposure meter pointer 4 assumes such a position that the tip 46a comes to rest beyond the diaphragm aperture value "22," then the tip is positioned opposite a red field 44c which is fixed on the movable scale strip 44. This means that the picture is overexposed when such light intensity prevails. If the tip 46a lines up with the letter "L" of the scale 44a, or with the area to the left of this letter, then exposure times longer than one-thirtieth second result up to the limit of the functioning capacity of the electronic timing device. The transition from an exposure time expressly specified on the scale 44a, to the indication "L" lies at one-thirtieth second in the illustrated example. This, however, is not to be considered as a "critical" limit.

If the picture taker wishes to work with an exposure time of one two-hundred-fiftieth second, he only has to turn the knob 41 until the figure 250 appears in the window 45a. Thereby the coil meter movement has been turned in its normal position toward the ladder conductor 15 in a clockwise direction. If once again the light intensity $H_1$ exists, then the exposure meter pointer 4 deflects to the same degree as was the case when the setting was one five-hundredth second at light intensity $H_1$. However, owing to the advance turning of the meter movement, the exposure meter pointer 4 now comes to rest upon the contact surface 15e, which in the following release results in diaphragm aperture value of "11." The condenser $C_5$ now engaged through the contact surface 15e has a capacity which is larger than that of the condenser $C_4$, so that $C_5$, together with the Ohmic value of the photoresistance $R_1$ corresponding to the light intensity $H_1$ results in the preselected exposure time of one two-hundred-fiftieth second. This exposure time is maintained as long as the tip 46a of the exposure meter pointer 4 remains opposite to one of the diaphragm aperture values of the stationary scale plate 45.

Whenever a relatively long exposure time, for instance one-sixtieth second (FIG. 5), is preselected, the exposure meter pointer 4 can reach the contact surface 15g with strong illumination. Within the range of this surface the reduction of resistance value of the photoresistance $R_1$ caused by the increasing light intensity is compensated for by the contact surface 15a. Thus a shorter exposure time than the preselected one is brought about in this range commensurate with the prevailing light condition.

Provisions are made in the camera design described above which make certain that the exposure meter pointer 4 is always in contact, during scanning with one of the contact surfaces 15a through 15g. For this purpose the fillets between the steps 6a through 6g of the scanning slide 6 are chamfered to the extent of the jointing widths between the contact surfaces 15a through 15g. In the event that the exposure meter pointer 4 comes to rest upon a junction between two contact surfaces, it is pressed upon the next contact surface during the scanning process by the sloping of slide 6 above the surface. This action does not give an incorrect exposure because whichever condenser is energized at the time, this condenser is assigned only to the corresponding diaphragm aperture value. Once the result of the scanning is set, the proper exposure time relative to the prevailing light intensity is formed in any case. If the light conditions change between the clamping of the pointer 4 onto one contact surface and the movement of shutter release, then the change is compensated for by modification of the preselected exposure time. The time formation can also be bridged in the same manner by means of smaller suitable changes in the step form of the diaphragm aperture values which can be kept less pronounced than shown in the example for descriptive reasons.

The embodiment illustrated in FIG. 3 essentially corresponds in structure and functioning with the design described above. Therefore, the parts which are identical with those of the camera design shown in FIGS. 1 and 2 are marked with the same reference number, but in addition also with an apostrophe. The ladder strip 48 shown in FIG. 3, which has the contact surfaces 48a through 48g, differs from the initially described version. The ladder strip 48 is assigned to a contact slider 49 that is fixed onto the diaphragm aperture setting ring 10' by an insulated mounting. Each of the contact surfaces 48a through 48g is electrically connected to a compensating condenser $C_1'$ through $C_7'$ and can be tapped off by means of the contact slider 49 depending on the scanning movement of the scanning slide 6'. Thus, like in the design first described, one of the condensers $C_1'$ through $C_7'$ is always inserted in the circuit of the electronic timing device. A stationary supporting ledge 50 is assigned to the exposure meter pointer 4' which merely controls the scanning movement of the slide 6' and therefore need not be made of conductive material. For clarity of illustration the switches $S_1$ through $S_3$ are twice shown in FIG. 3, specifically in connection with the wiring diagram of the electronic timing device and with the parts that actuate them. In the actual device there is, of course, only one switch $S_1$ and one switch $S_3$. The handling and functioning of the embodiment in FIG. 3 is identical to that shown in FIGS. 1 and 2 and described above. Therefore, prior to release only the desired exposure time needs to be set by means of the knob 41'. During the release movement the diaphragm aperture is set by means of the scanning slide 6' depending on the pointer position and simultaneously on the scanning movement of the contact slider 49 upon the contact surfaces 48a through 48g. One of the compensating condensers $C_1'$ through $C_7'$ is thereby placed into the circuit of the electronic timing device, so that the result is the preselected exposure time as long as the pointer 46a' points to one of the aperture values of the stationary scale plate 45'. If the tip 46a comes to rest outside of this plate, then the contact slider 49 rests upon respective contact surface 48a, 48g, and, as in the case of the design example according to FIGS. 1 and 2 a lengthening or shortening of the exposure time results depending on prevailing light conditions.

It will be understood that the foregoing description with the details of exemplary structure is not to be construed in any way to limit the invention, but that modifications may be made thereto without departing from the scope of the invention as set forth in the following claims.

Having thus described the invention I claim:

1. A photographic camera including an exposure meter having photoresistance means for determining diaphragm aperture and time value in accordance with light conditions, said exposure meter having setting means to preselect the time, scanning means cooperating with said exposure meter, electronic timing means having RC members and cooperating with said exposure meter and said scanning means, said electronic timing means having a circuit with a plurality of compensating condensers of different capacities; each of said condensers being electrically connected to a contact surface, the number of said condensers corresponding to the number of steps of a scanning element of said scanning means, and a movable contact part engageable with said contact surfaces and cooperating with the pointer of said exposure meter for inserting one of said condensers into the circuitry of said electronic timing means to form an RC member.

2. The photographic camera of claim 1 wherein said contact surfaces are on a movable element of said exposure meter.

3. The photographic camera of claim 2 wherein said movable contact part is formed by said exposure meter pointer.

4. The photographic camera of claim 1 wherein said contact surfaces are assigned to a movable contact element connected to said scanning element for movement therewith 5 The photographic camera of claim 4 wherein said movable contact element is fitted onto the aperture setting ring of said camera and connected to said scanning element for movement therewith.

6. The photographic camera as defined in claim 1 having a scale strip movable in the frame of said exposure meter, said strip having scales for exposure time and diaphragm aperture setting; said movable scale strip cooperating with a stationary scale plate having a diaphragm aperture scale, said scales cooperating with said light-dependent deflecting pointer of said exposure meter.

7. A photographic camera including an exposure meter means having a photoresistance for determining diaphragm aperture and time value in accordance with light conditions, scanning means cooperating with said exposure meter, said scanning means being connected to the diaphragm setting ring of said camera, electronic timing means having RC members and cooperating with said exposure meter means and said scanning means, said electronic timing means having a circuit with a plurality of compensating condensers of different capacities; each of said condensers being electrically connected to a contact surface, the number of said condensers corresponding to the number of steps of a scanning element of said scanning means, and a movable contact part operably connected to said exposure meter means and engageable with said contact surfaces for inserting one of said condensers into the circuit of said electronic timing means to form an RC member.

8. The photographic camera of claim 7 wherein said contact surfaces are on a movable element of said exposure meter and wherein said movable contact part is formed by said exposure meter pointer.

9. The photographic camera of claim 7 wherein said contact surfaces are engageable by said movable contact part which is connected to said scanning element for movement therewith and wherein said movable contact part is fitted onto the diaphragm aperture setting ring of said camera.

10. The photographic camera as defined in claim 7 having a scale strip movable in the frame of said exposure meter, said strip having scales for exposure time and diaphragm aperture setting; said movable scale strip cooperating with a stationary scale plate having a diaphragm aperture scale, said scales cooperating with said light-dependent deflecting pointer of said exposure meter means.